(12) United States Patent
Christensen et al.

(10) Patent No.: US 7,600,960 B2
(45) Date of Patent: Oct. 13, 2009

(54) METHOD FOR TRANSFER OF PARTICULATE SOLID PRODUCTS BETWEEN ZONES OF DIFFERENT PRESSURE

(76) Inventors: Lena H. Christensen, Stengade 82b, 2. th, 3000 Helsingør (DK); Borge H. Christensen, Odinshøjvej 116, 3140 Ålsgårde (DK)

( * ) Notice: Subject to any disclaimer, the term of this patent is extended or adjusted under 35 U.S.C. 154(b) by 1301 days.

(21) Appl. No.: 10/486,102

(22) PCT Filed: Jul. 22, 2002

(86) PCT No.: PCT/DK02/00507
§ 371 (c)(1),
(2), (4) Date: Apr. 26, 2004

(87) PCT Pub. No.: WO03/013714
PCT Pub. Date: Feb. 20, 2003

(65) Prior Publication Data
US 2004/0184900 A1   Sep. 23, 2004

(30) Foreign Application Priority Data
Aug. 11, 2001   (DK) ............................. 2001 01208

(51) Int. Cl.
*B65H 1/00* (2006.01)
*B65G 53/46* (2006.01)
*B65G 53/48* (2006.01)
(52) U.S. Cl. .................. 414/805; 414/218; 414/219
(58) Field of Classification Search ......... 414/218–219, 414/805
See application file for complete search history.

(56) References Cited

U.S. PATENT DOCUMENTS

| | | | | |
|---|---|---|---|---|
| 2,732,086 A | * | 1/1956 | Schnyder | 414/219 |
| 2,765,899 A | * | 10/1956 | Ballard | 414/326 |
| 3,232,419 A | * | 2/1966 | Rasmussen | 198/661 |
| 4,138,162 A | * | 2/1979 | Noren | 406/61 |
| 5,044,837 A | * | 9/1991 | Schmidt | 406/85 |
| 5,095,825 A | | 3/1992 | Arpalahti et al. | |
| 5,374,148 A | | 12/1994 | Kipelainen et al. | |

(Continued)

FOREIGN PATENT DOCUMENTS

EP   0584453 B1   5/1996

(Continued)

*Primary Examiner*—Saúl J Rodríguez
*Assistant Examiner*—Jonathan D Snelting
(74) *Attorney, Agent, or Firm*—Budde Schou A/S; Robert C. Casad, Jr.

(57) ABSTRACT

The method invented is based on sluice system according to which the product is first conveyed through a portioning device, which produces a sequence of uniform product portions divided by uniform particle free spaces, and subsequently the product portions are conveyed individually through a sluice device, which comprises at least one sluice chamber and two pressure locks of which at least one at any time secures a pressure tight barrier between the two pressure zones, and the product portions are force loaded from the first zone into a sluice chamber by means of a piston screw, the axis of which is practically in line with the axis of the sluice chamber, and the product portions are force unloaded from the sluice chamber and into the second pressure zone by means of said piston screw or a piston or by means of gas, steam or liquid supplied at a pressure higher than that of the second pressure zone.

17 Claims, 14 Drawing Sheets

Figure 1A:
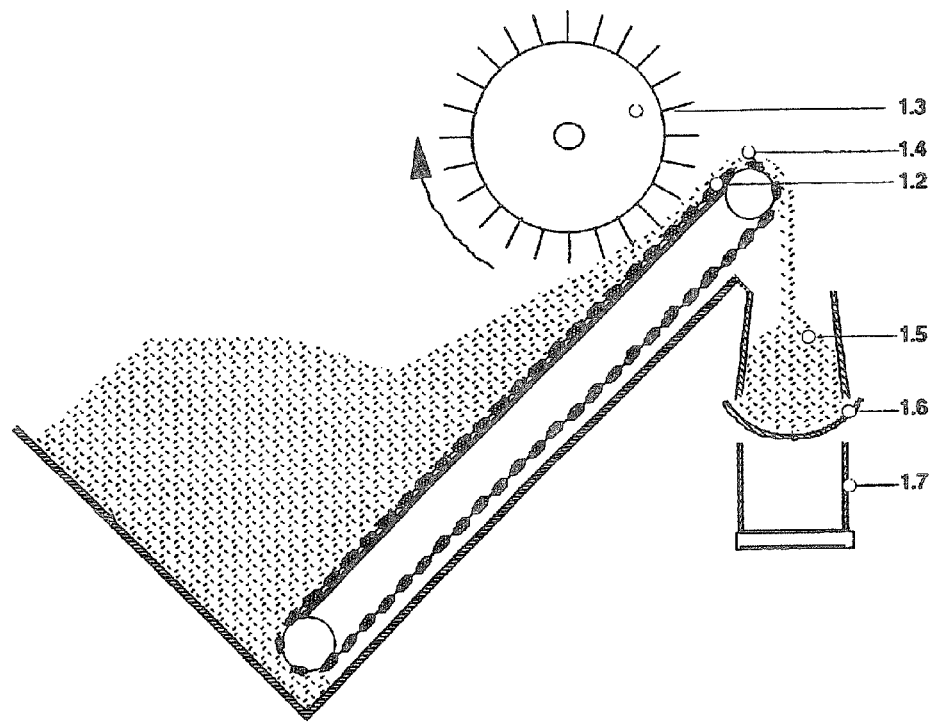

U.S. PATENT DOCUMENTS 5,466,108 A     11/1995  Piroska
5,658,123 A  *   8/1997  Goff et al. .................. 414/805

FOREIGN PATENT DOCUMENTS

| | | | |
|---|---|---|---|
| EP | 953525 A2 * | 11/1999 | |
| SE | 218793 C | 2/1968 | |
| SE | 500516 C2 | 7/1994 | |
| WO | 456645 B | 10/1988 | |
| WO | WO92/06030 A1 | 4/1992 | |
| WO | WO 93/00282 A1 | 1/1993 | |
| WO | WO 96/06673 A1 | 3/1996 | |
| WO | WO 96/09113 A1 | 3/1996 | |
| WO | WO96/09113 A1 | 3/1996 | |

* cited by examiner

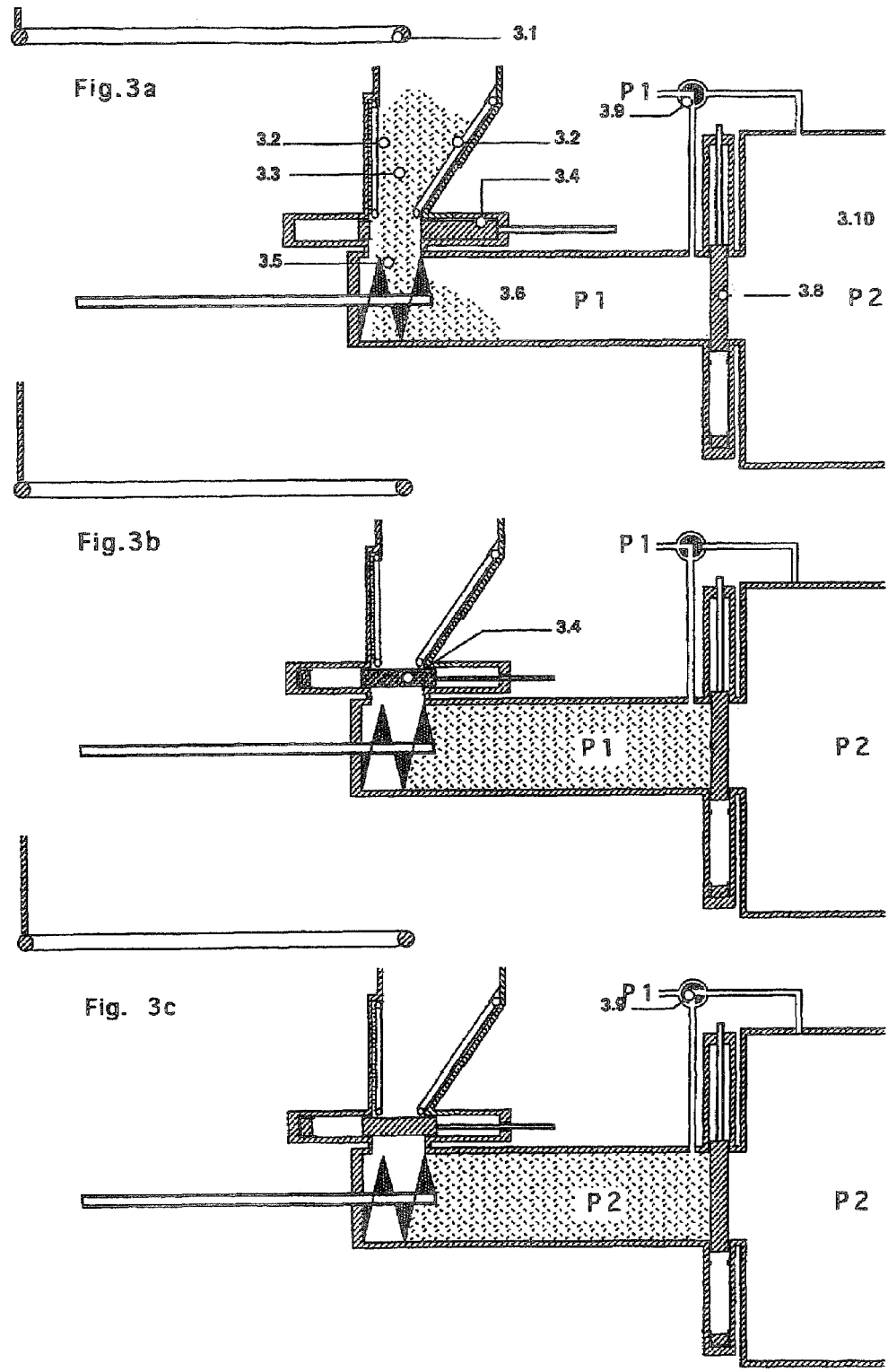

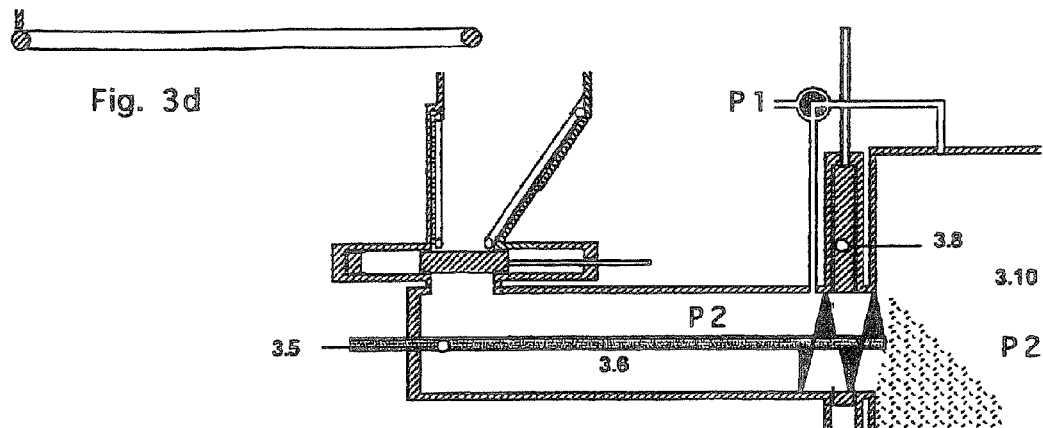
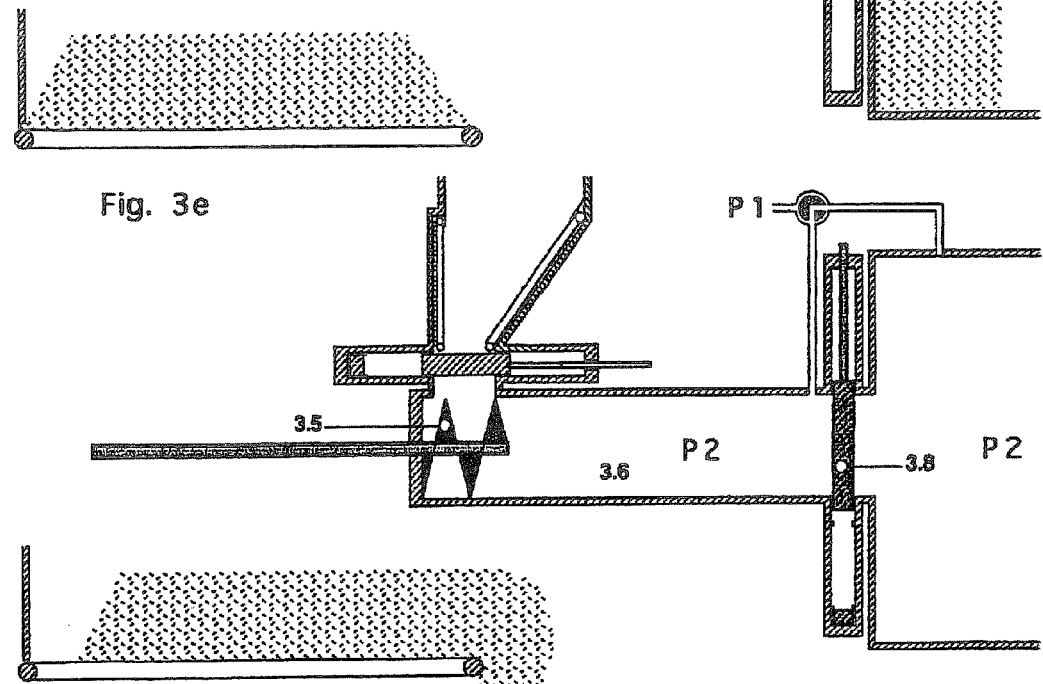
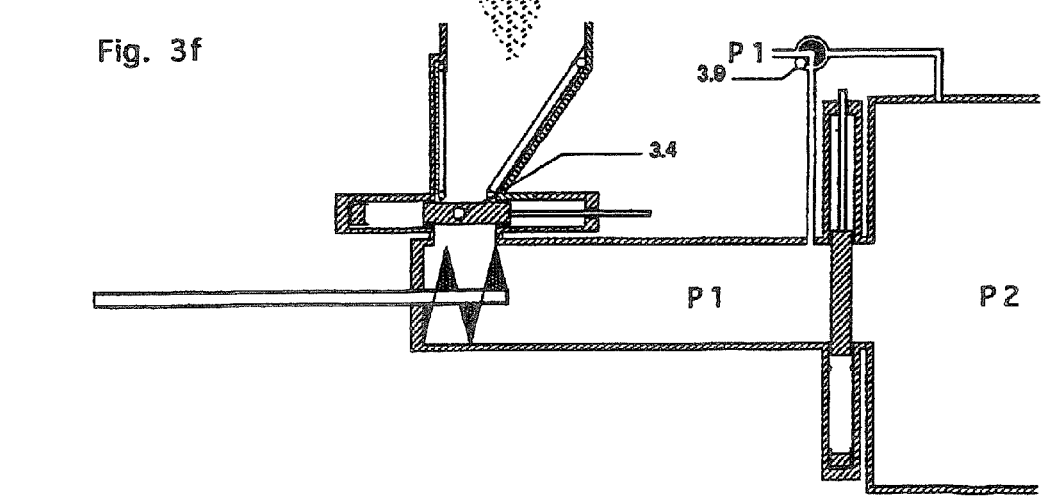

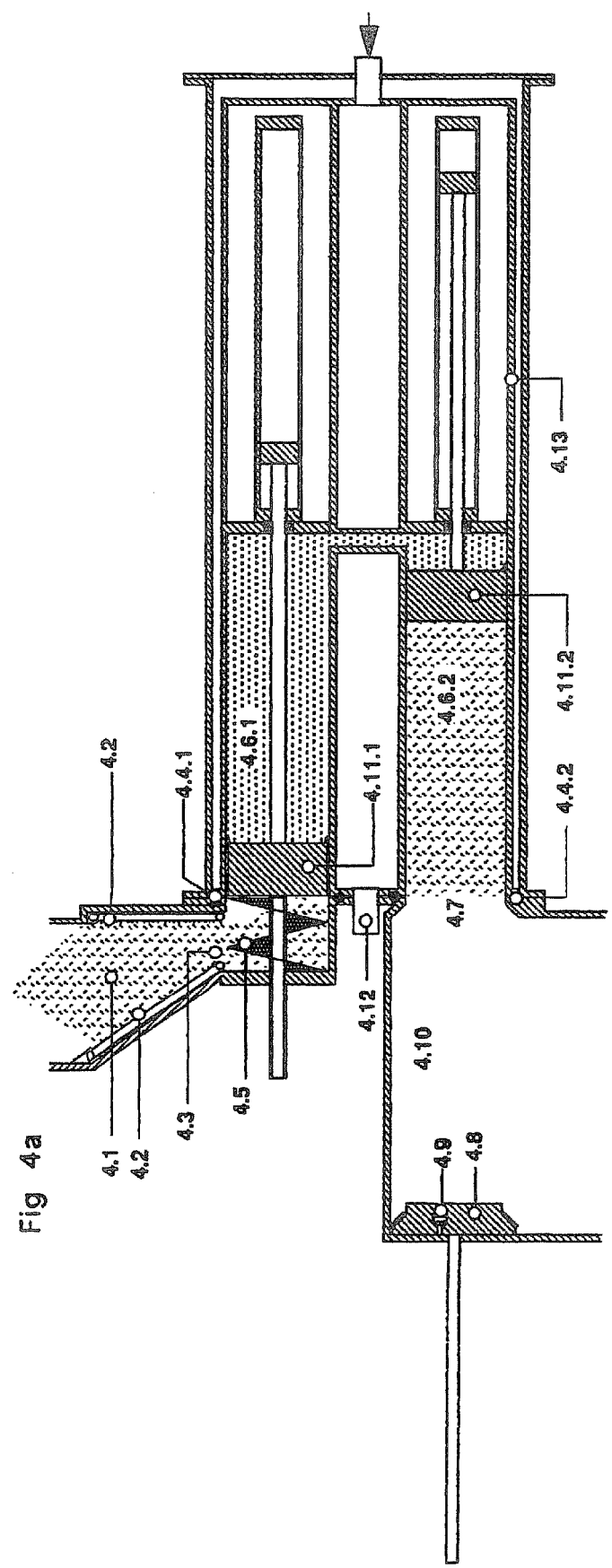

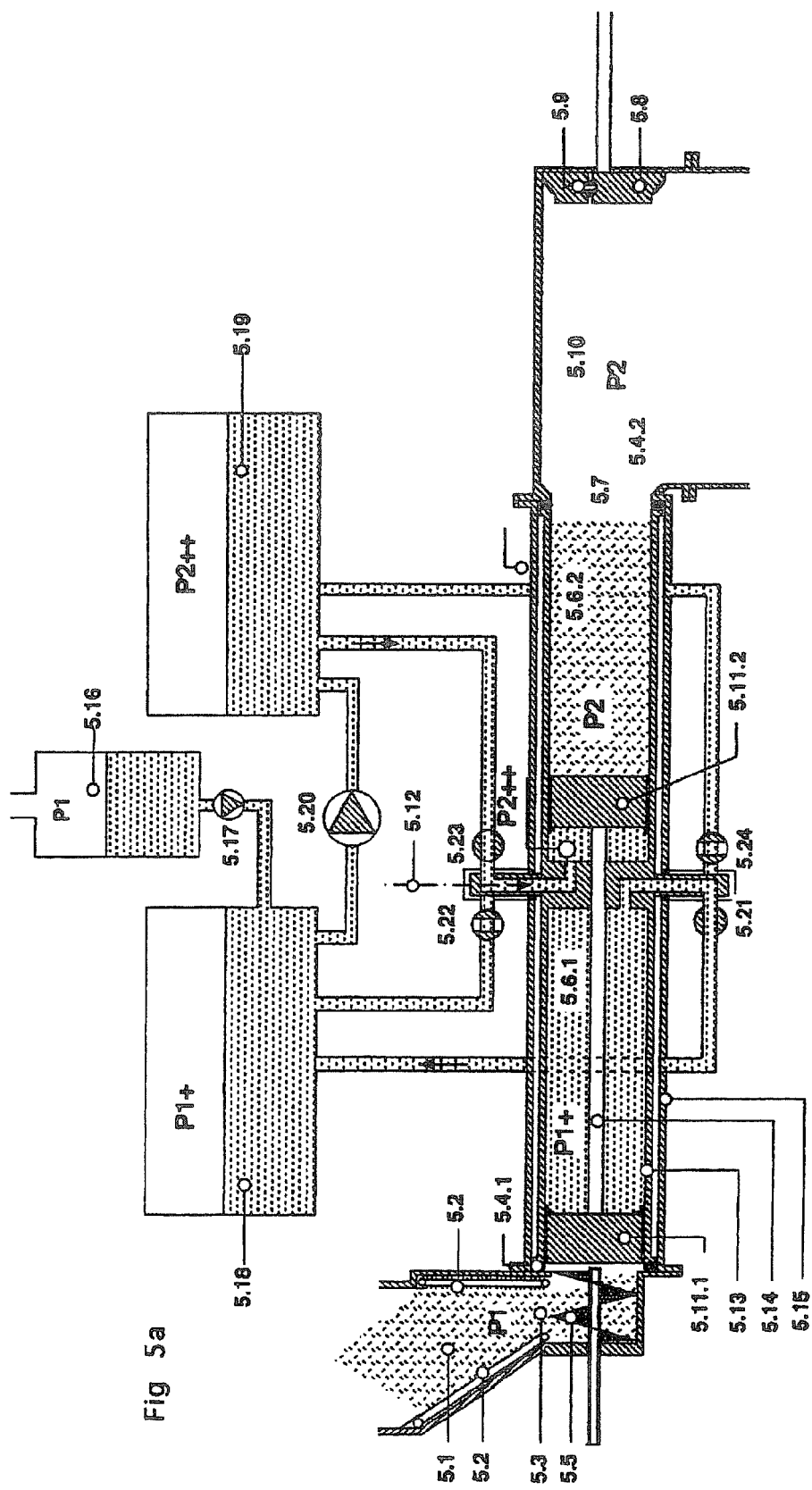

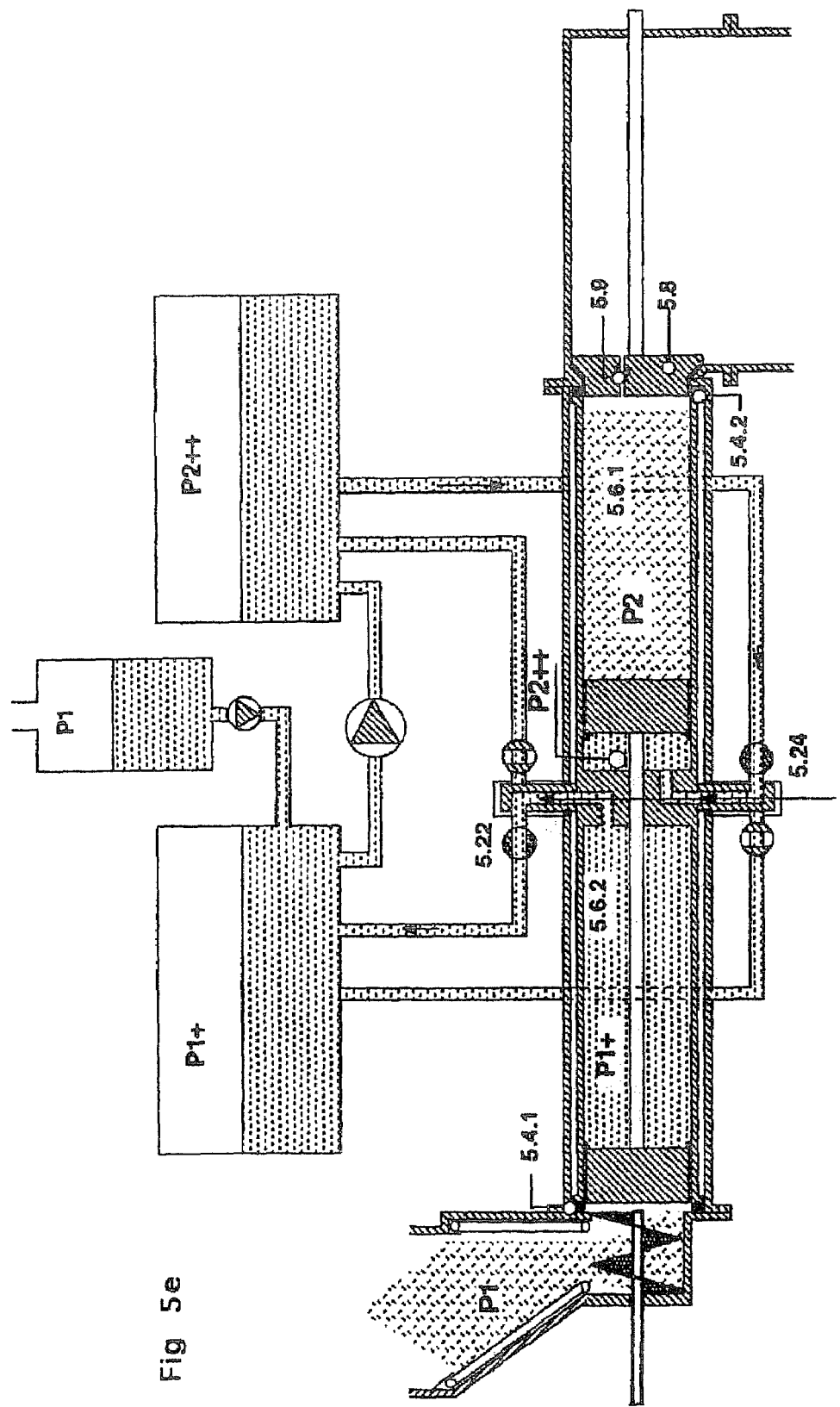

METHOD FOR TRANSFER OF PARTICULATE SOLID PRODUCTS BETWEEN ZONES OF DIFFERENT PRESSURE

The invention relates to a method and apparatus for transfer of particulate products between zones of different pressure.

The invention is especially suitable for transfer of low density biomass such as straw but not limited to that.

The method invented is based on a sluice system according to which the product is first conveyed through a portioning device, which produces a sequence of uniform product portions divided by uniform particle free spaces, and subsequently the product portions are conveyed individually through a sluice device, which comprises at least one sluice chamber and two pressure locks of which at least one at any time secures a pressure tight barrier between the two pressure zones, and the product portions are force loaded from the first zone into a sluice chamber by means of a piston screw, the axis of which is practically in line with the axis of the sluice chamber, and the product portions are force unloaded from the sluice chamber and into the second pressure zone by means of said piston screw or a piston or by means of gas, steam or liquid supplied at a pressure higher than that of the second pressure zone.

A piston screw in this context means a screw conveyor to which a reciprocating axial movement can be added independent of the rotation. An example of a piston screw is described in SE Patent 469.536.

A sluice system in this context means a portioning device combined with a sluice device. A sluice device means a sluicechamber combined with pressure locks.

A sluice chamber in the sense of the invention is a chamber which alternately can be connected to one of two pressure zones, while it at the same time is pressure tight separated from the other pressure zone. The devices which in closed condition secures pressure tight separation will in the following be called pressure locks.

Force loaded/unloaded means loaded/unloaded by positive product conveying which imply, that other conveying forces than gravity are applied.

BACKGROUND

There is an increasing interest in producing energy, cellulosis, ethanol and other products from biomass. This includes, that the biomass undergoes pressurized processes, such as steam treatment, hydrolyzation, solvent extraction, pulping, explosion pulping, gasification, drying with superheated steam. The biomass can comprise of dry or wet particles or particles suspended in a liquid.

To achieve lowest possible production costs, it is crucial to establish reliable continuous processes and produce round the clock throughout the year.

Straw is a large biomass resource, which have not yet been intensively exploited, because its properties makes it very difficult to transport into, through and out of pressurized equipment. The main obstacles are:

Straw has a low density (loose shredded straw app. 50 kg/m$^3$).

Straw is a non flowing product and has very strong bridging properties.

Straw has a high content of abrasive silicon.

These obstacles means that a method and apparatus able to handle straw in relation to pressurized equipment will be able to handle almost everything else such as woodchips, coal, residential garbage, by-products from slaughterhouses etc.

To be reliable the apparatus must meet the following requirements:

machine parts should only to a very limited extend "cut through" the product, in order to avoid wear and jamming.

the risk of bridging should be eliminated by forcing the product through the critical zones. This means that forced loading and unloading of sluice chambers are absolutely necessary.

it should be possible to compress low density products to a higher density in order to obtain a suitable capacity within reasonable dimensions.

None of the known methods and apparatus based on sluice devices are meeting these requirements.

SE Patent 469 536 describes a chamber into which product is conveyed by a piston screw. At the inlet a cylinderknife slides forward and cuts through the product to close the inlet, but its function is to close for product and not to provide a pressure lock. At the outlet there is a pressure lock, but since there is only one, It is not a sluice device as previously defined. The apparatus is a plug flow feeder based on the ability of the higly compressed plug of product to reduce escape of gas when the pressure lock is open.

Rotary locks e.g. U.S. Pat. No. 5,114,053, where a rotor, comprising several pockets, rotates continuously in a cylindrical housing, demands a product with good flow properties. Machine parts have to "cut through" the product, which is problematic especially at the inlet. The product cannot be compressed and forced loading/unloading is not possible.

By DT Patent 24 26 035 a rotor with one sluice chamber turns intermittently, allowing the opening alternately to be connected to the high and the low pressure zones. A piston in the sluice chamber secures forced unloading of the sluice chamber and prevents emission from the high pressure zone. The product is not force loaded into the sluice chamber, therefore it can not be compressed, and machine parts have to "cut through" the product.

U.S. Pat. No. 5,095,825 describes a method where a rotor has two sluice chambers, which are force unloaded by pistons placed in the sluice chambers. The openings of the sluice chambers are placed in one end of the rotor, so that each of them will be connected to one of the two pressure zones when the rotor stops. The method seeks to reduce the risk of bridging during loading of the sluice chamber by creating a vacuum with the piston. This means, that the risk of bridging is only partly reduced if the product is penetrable for air. Machine parts would have to "cut through" the product and it is not possible to compress the product by this method.

By U.S. Pat. No. 5,819,992 a rotor with several parallel sluice chambers is used. The sluice chambers have inlet in one end and outlet in the other end. When the rotor stops for loading of one sluice chamber and unloading of another, tightness is established by expansion of dynamic sealing rings. When the loading/unloading operation is finalized, the dynamic sealing rings are contracted, thereafter the rotor can move to the next position with less friction but incomplete tightness. The method does not include portioning, so machine parts have to "cut through" the product. Furthermore the method does not include forced loading, option for compression or forced unloading.

SE Utläggningsskrift 456 645 describes a T-shaped sluice chamber, which forces the product to make a perpendicular movement from horizontal to vertical direction. The product is conveyed past the inlet pressure lock and into the sluice chamber by means of a piston or a piston screw, and thereafter the product has to fall by gravity only through the vertikal branch, until it lands on the outlet pressure lock. A separate piston secures forced unloading of the sluice chamber. The fact that the product during the loading of the sluice chamber has to make a 90° turn by means of gravity only increases the risk of bridging, and makes capacity increasing compression of the product in the sluice chamber impossible.

By U.S. Pat. No. 5,192,188 the product is loaded into the sluice chamber by means of gravity only, which gives a very poor filling. The discharge piston has to "cut through" the product at the inlet opening, and capacity increasing compression is not possible.

The advantage by the method according to the invention is, that it meets all the requirements for transfer of particulate, abrasive, low density, non flowing products between zones with different pressures.

To avoid "cutting through" the product the method according to the invention comprises a portioning device before the sluice device. The portioning device produces one or several sequences of uniform product portions divided by uniform particle free spaces. The particle free spaces secures, that no product particles occur in the working space of the pressure locks when they are closing.

To achieve force loading, the product portions are conveyed into the sluice device by means of a piston screw. The rotation and axial movement of the screw piston can be controlled independently which makes it possible to provide any degree of compression from light packing to transformation of the product portions into solid plugs.

Force loading and the possibility to achieve an adjustable compression of the product are very important features of the invention, because of the improved reliability and increased capacity that the apparatus according to the invention will achieve compared to the known apparatus. The known apparatus is designed to transfer particles of coal and wood with densities from 0.4-0.8 compared to 0.05 for shredded straw. This means, that the capacity on straw would drop to app. 10% if the volume of the sluice chamber was unchanged.

To achieve forced unloading of the sluice chamber according to the invention, different embodiments of the invention can be selected depending on whether emission from the high pressure zone during transfer of product from the sluice chamber to the high pressure zone is acceptable or not.

If emission is acceptable, as for example when the emission consists of steam, from which energy can be recovered by condensation, the piston screw which performs the forced loading can also perform the forced unloading of the sluice chamber. This implies that for each product portion transferred into the high pressure zone, a volume of steam will be transferred to the sluice chamber and further on to the place of condensation. For this situation pressure lock devices can be selected among well known valves such as slid valves, ball valves or piston valves. The inner diameter of the valves should at least be of the same size as that of the sluice chamber. Before opening the pressure locks, the pressure of the sluice chamber must be adjusted to establish substantially the same pressure at both sides of the pressure lock in order to reduce the power needed to open the pressure lock.

In special situations such as explosion pulping, where the product has to be discharged at high speed from the high pressure of the digester, the pressure of the sluice chamber should be maintained or even increased to accelerate the product to a very high velocity when the pressure lock is opened. For this special situation the diameter of the valve can be much smaller than the diameter of the sluice chamber, because of the high velocity of the product during discharge. A ball valve is a good choice because it can be opened completely in a very short time.

If emission is unacceptable for example when poisonous, explosive or malodorous gases are involved, the preferred embodiment of the invention comprises a rotor with two sluice chambers placed practically parallel to the axis of the piston screw, and either perpendicular or parallel to the axis of the rotor and equipped with pistons for forced unloading.

In this preferred embodiment of the invention the sealing system preventing gases vapours or liquid to leak out when product is transferred from the sluice chamber into the high pressure zone have to be resistant to the impact of the chemicals and the temperatures prevailing in the high pressure zone. By gasification for example the temperatures can be in the range of 700-1100° C. and process gases can contain considerable amounts of tare, which can condense at the much lower temperature of the sluice chamber. To avoid hot process gas to enter into the sluice chamber during unloading, it is known for example from U.S. Pat. No. 5,095,825 and DT 24 26 035 A1 to raise the pressure of the sluice chamber before unloading by means of pressurized inert gas. The supply of inert gas is however a substantial extra cost, and therefore a special sealing system has been developed to the invention, which practically eliminates leaking of process gas without utilization of pressurized inert gas at all.

The special sealing system comprises three sealing devices, which will be active at three different places.

The first sealing device comprises two sealing rings which will be active between the open ends of the sluice chambers and the outlet of the low pressure zone and the inlet of the high pressure zone during loading and unloading. This first sealing device is a known type of seal which can be extended to establish tightness during loading respectively unloading and contracted during movement of the rotor in order to avoid friction.

The second sealing device shall prevent escape of gas, vapour or liquid from the high pressure zone into the part of the sluice chamber behind the piston. Emission can occur when the sealing edges of the piston become worm, which is inevitable especially when silicia is present in the product. The second sealing device uses gas, vapour or liquid behind the piston, pressurized to substantially the same pressure as that of the low pressure zone during loading, and pressurized to the same or a higher pressure than that of the high pressure zone during unloading. The pressurized gas, vapour or liquid can also be used to move the piston during unloading.

The third sealing device comprises a vessel housing the rotor and is providing a sealed connection between the two pressure zones. This third sealing device will take care of any emission from the high pressure zone caused by wear or failures of the two other sealing devices. Any emission to the vessel will be detected and directed to a place where it will do no harm. The detection can release the action necessary to stop further emission.

DETAILED DESCRIPTION

The method of the invention is based on a sluice system comprising a portioning device and a sluice device. In the following the invention is described in details by means of two examples of embodiments of the portioning device and three examples of embodiments of the sluice device.

Figure 1B:
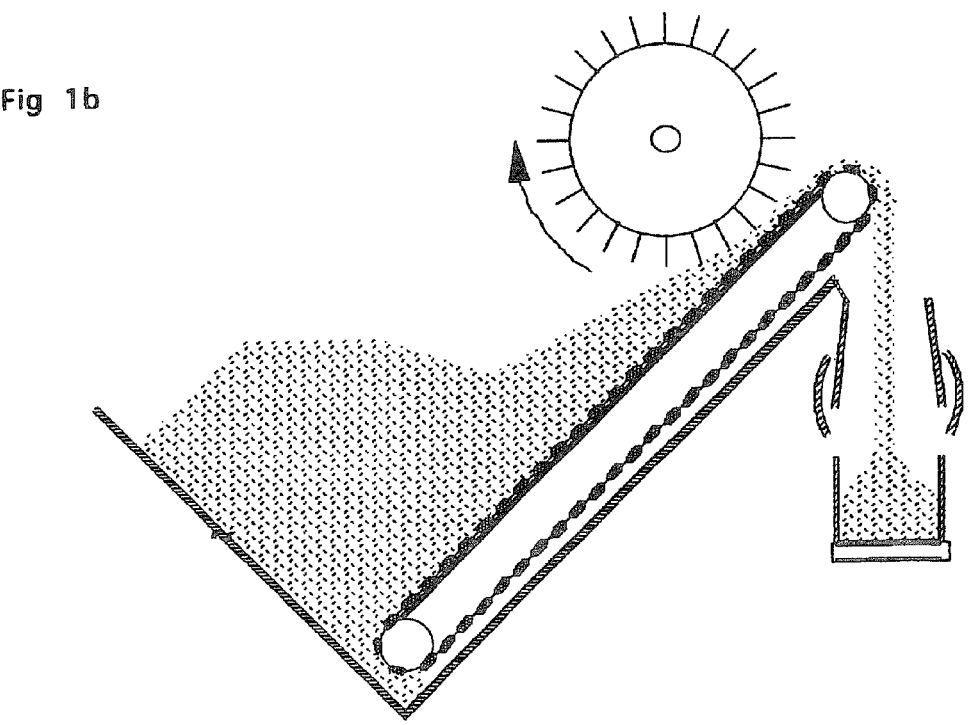

Example 1 describes a portioning device appropriate for atmospheric conditions and with good buffering capacity for the product to be transferred. FIGS. 1a and 1b are illustrating example 1.

The feed conveyer 1.2 moves the product under a leveling rotary drum 1.3 creating a product flow with uniform cross section. The thickness of the product layer 1.4 can be adjusted by changing the distance between 1.3 and 1.2. At the upper end of 1.2 the product drops into the hopper 1.5 with bottom trap doors 1.6. When the correct amount of product has been transferred into the hopper 1.5, the trap doors 1.6 will open up and the product portion will drop into the belt conveyer 1.7, which will move the portion into the sluice device (not shown). When the hopper 1.5 has been unloaded, the trap doors 1.6 will be closed and the accumulation of a new product portion will begin.

Figure 2A:
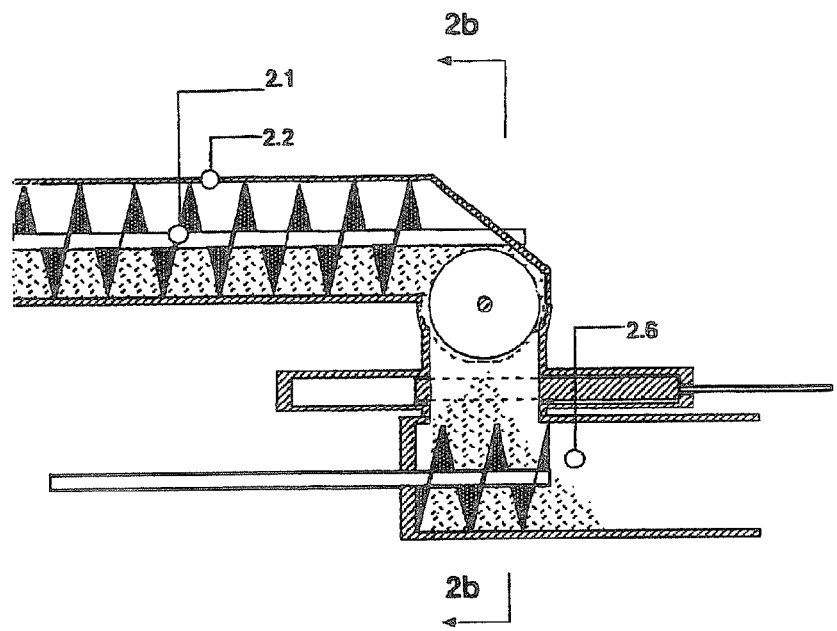
Figure 2B:
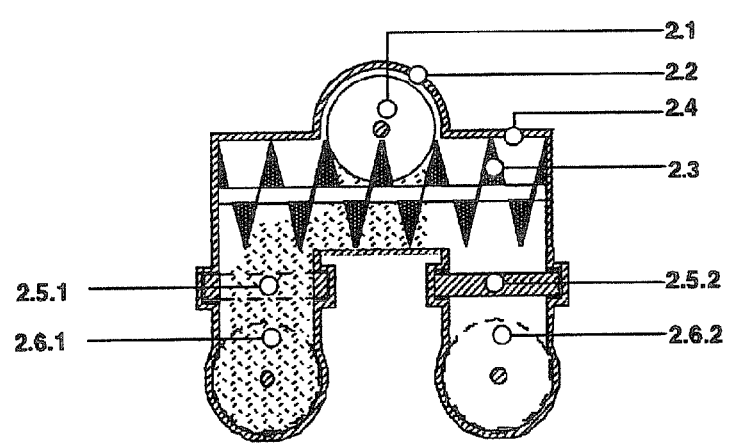
Figure 4B:
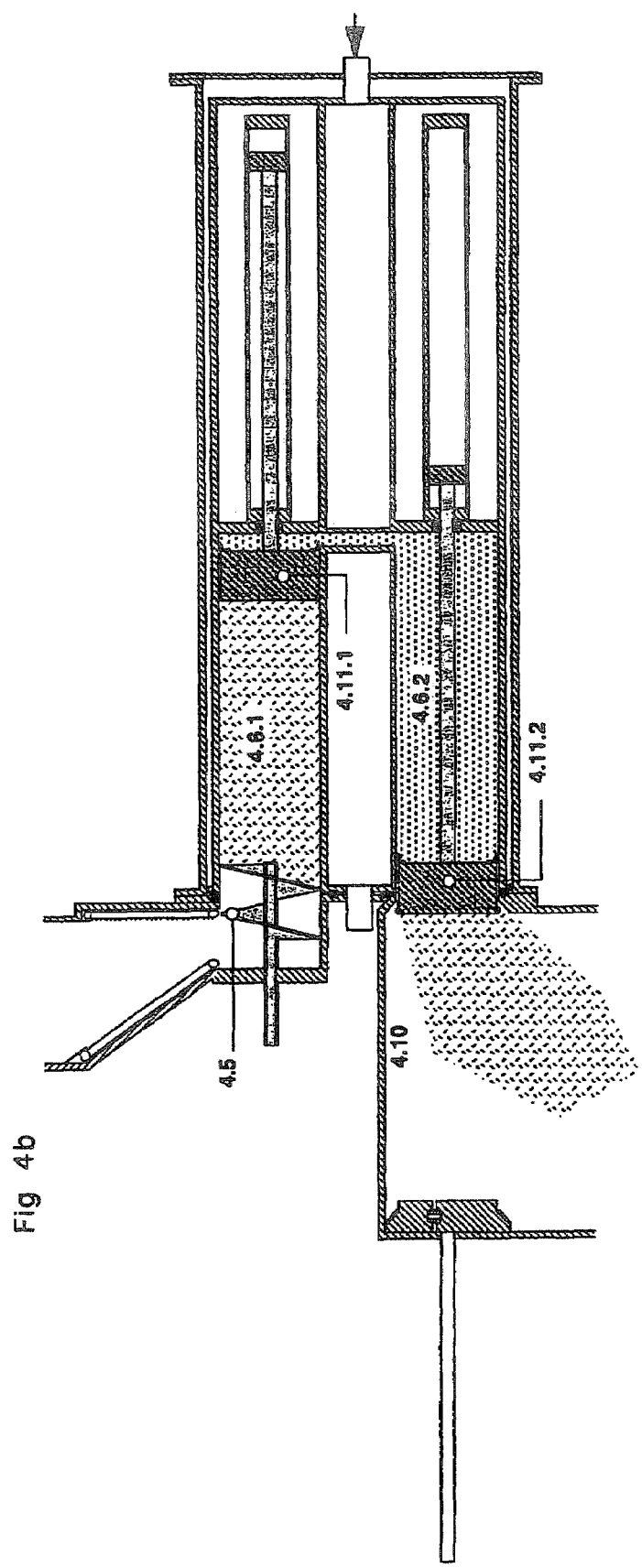
Figure 4C:
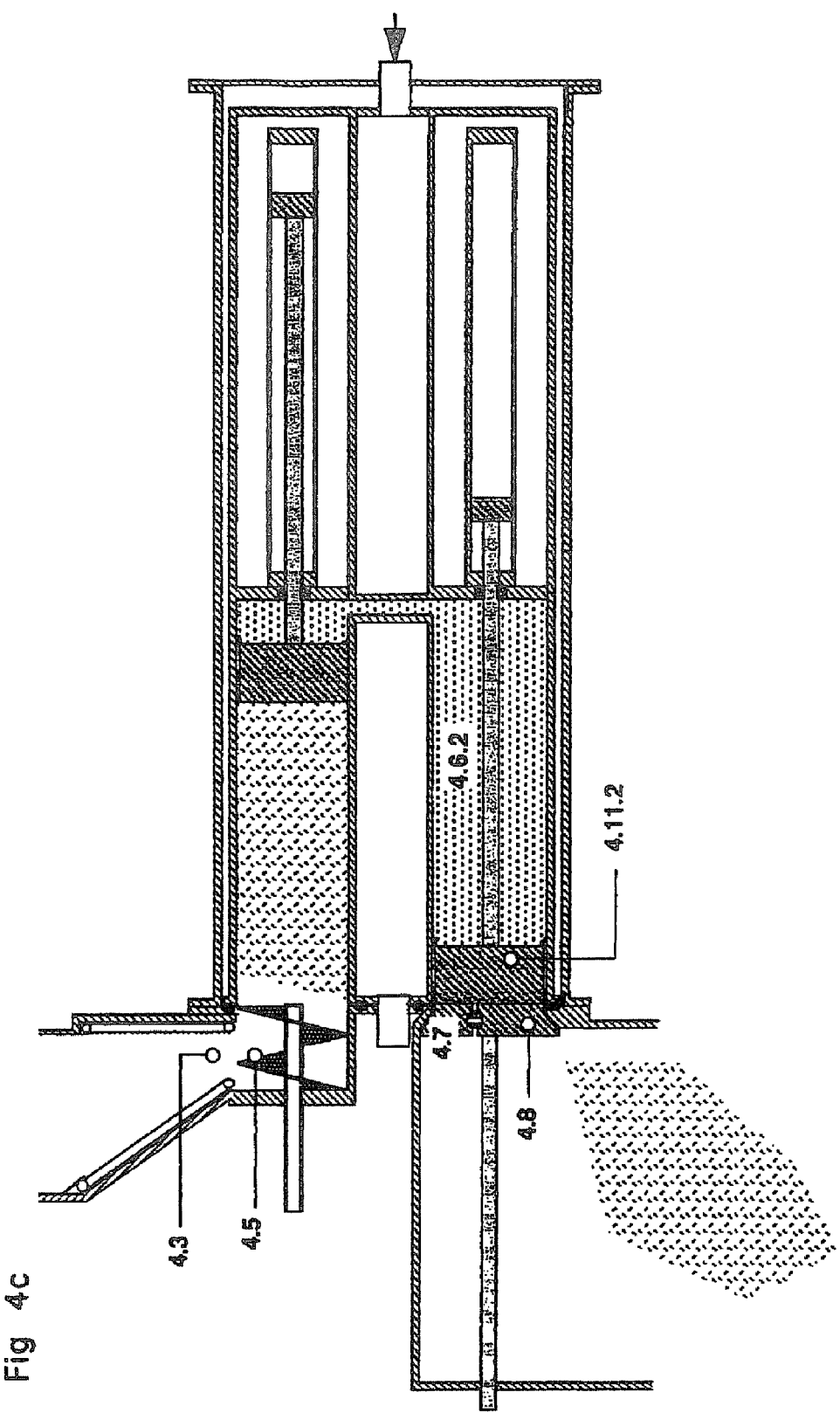
Figure 4D:
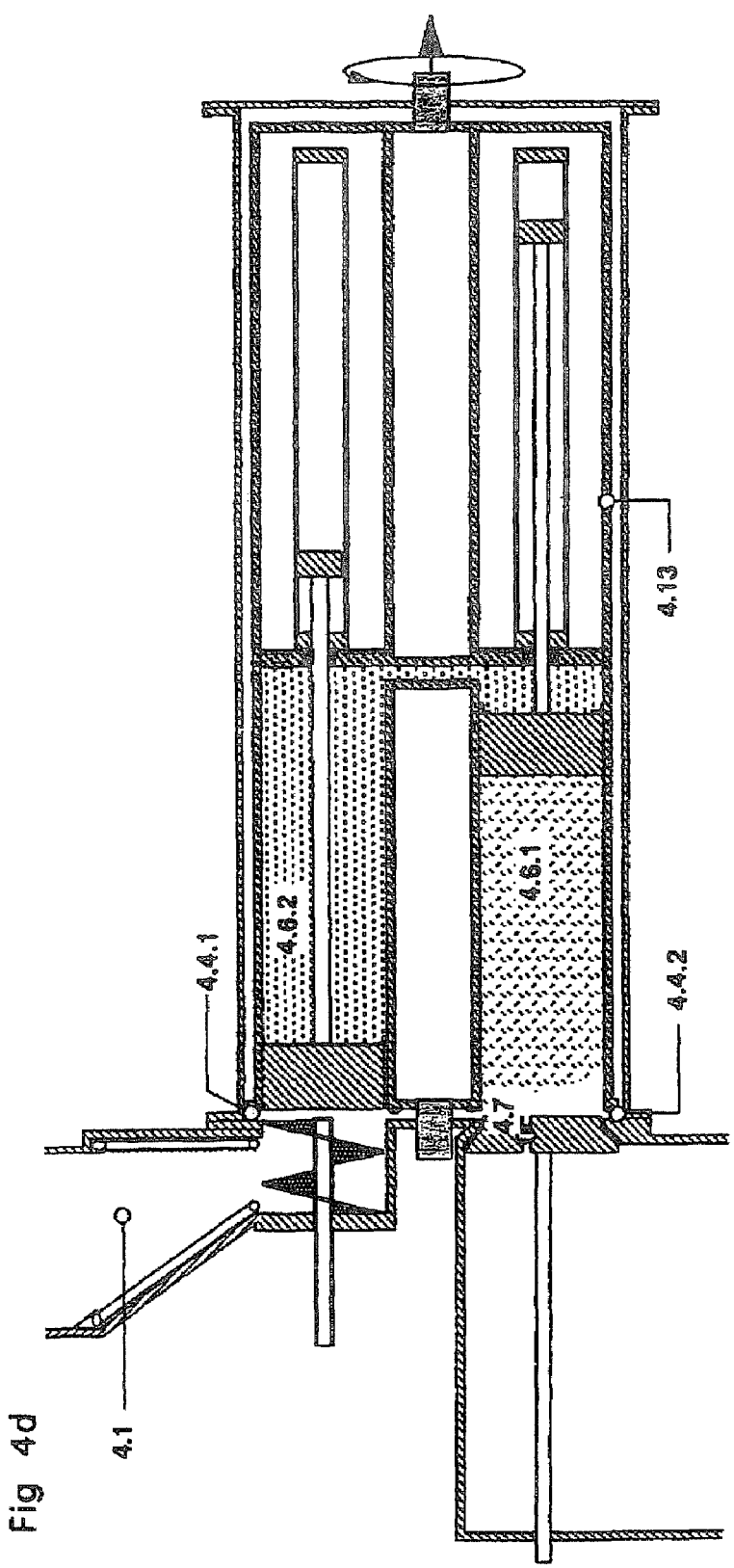
Figure 4E:
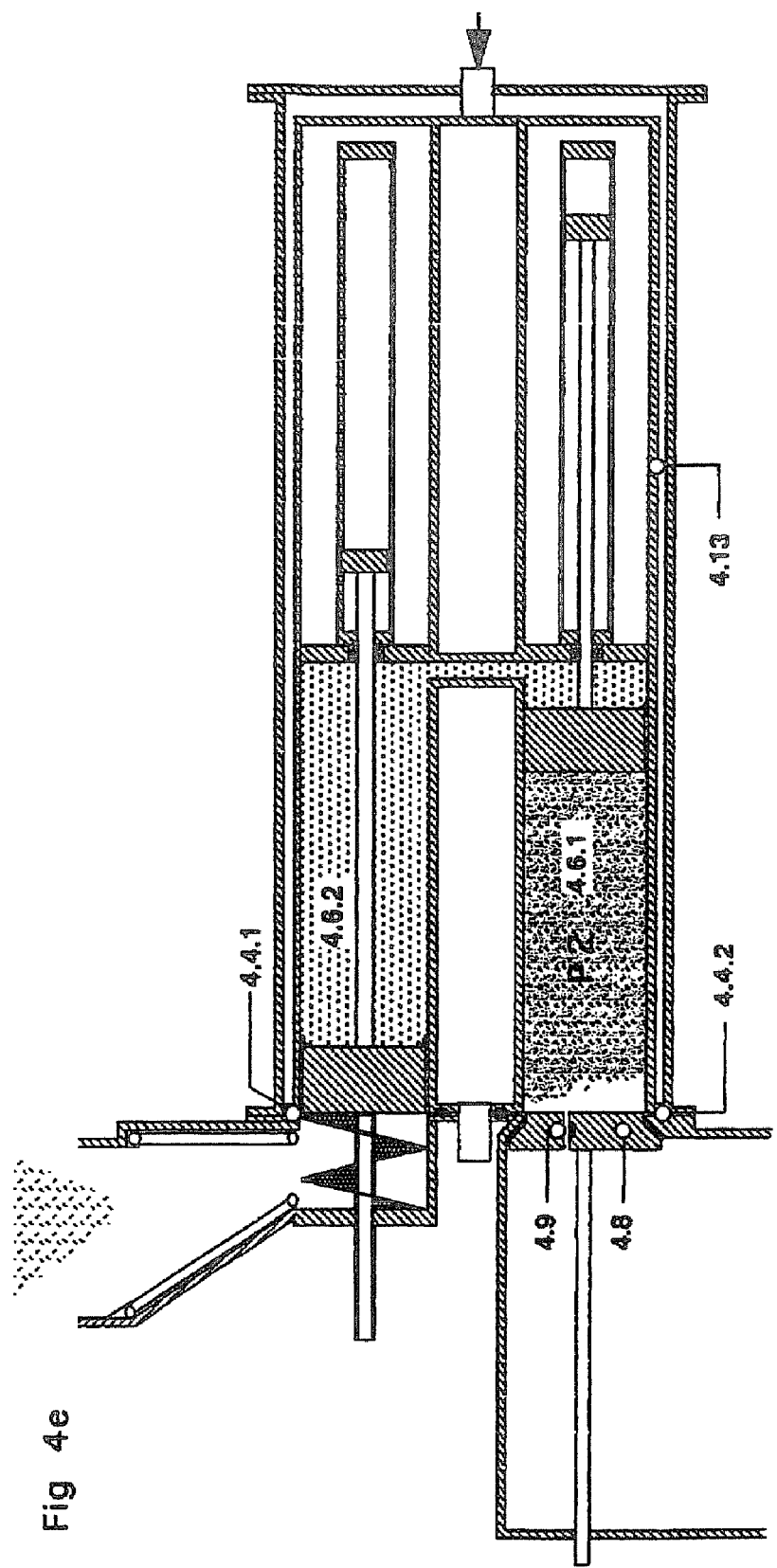
Figure 5B:
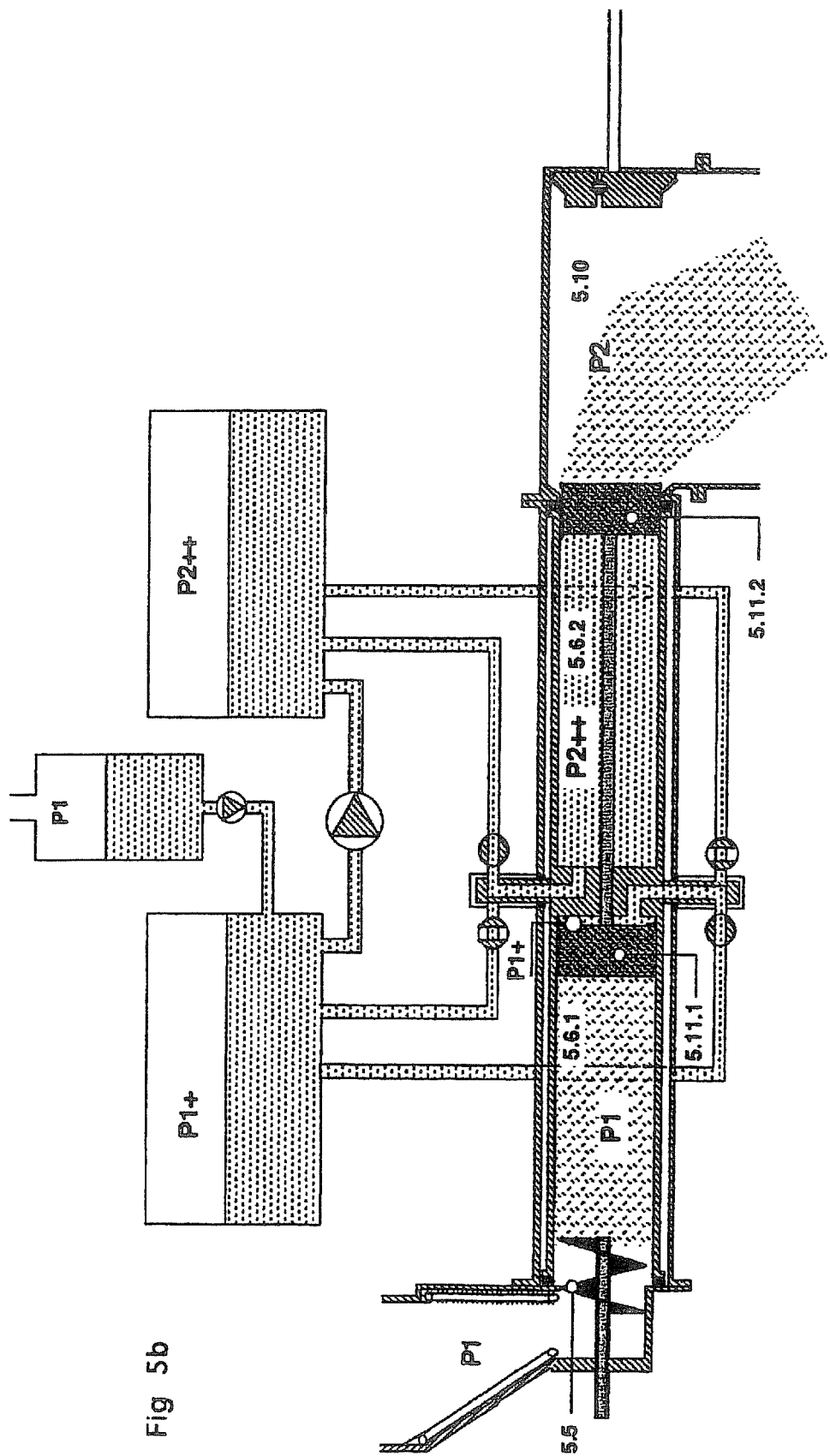
Figure 5C:
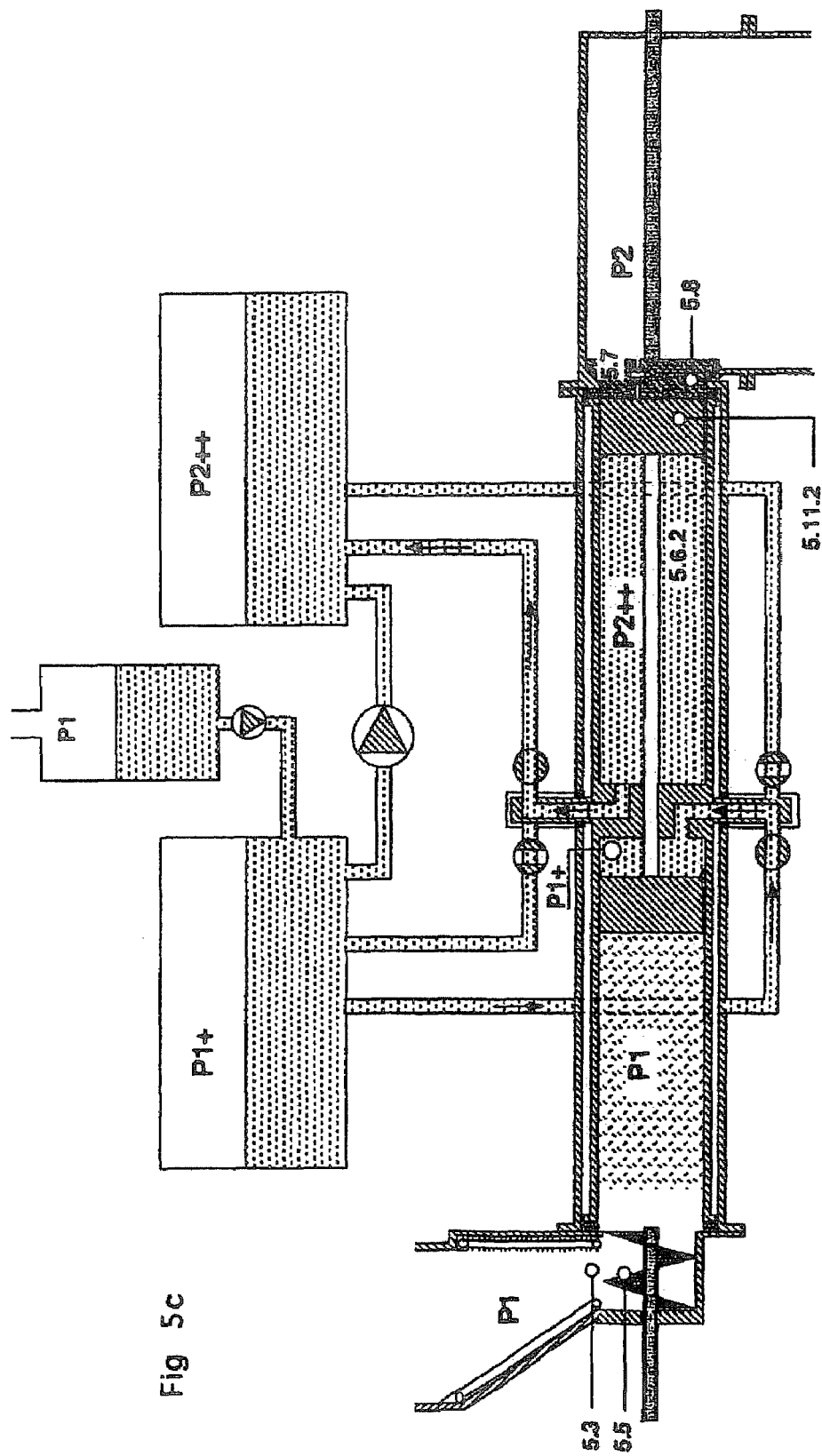
Figure 5D:
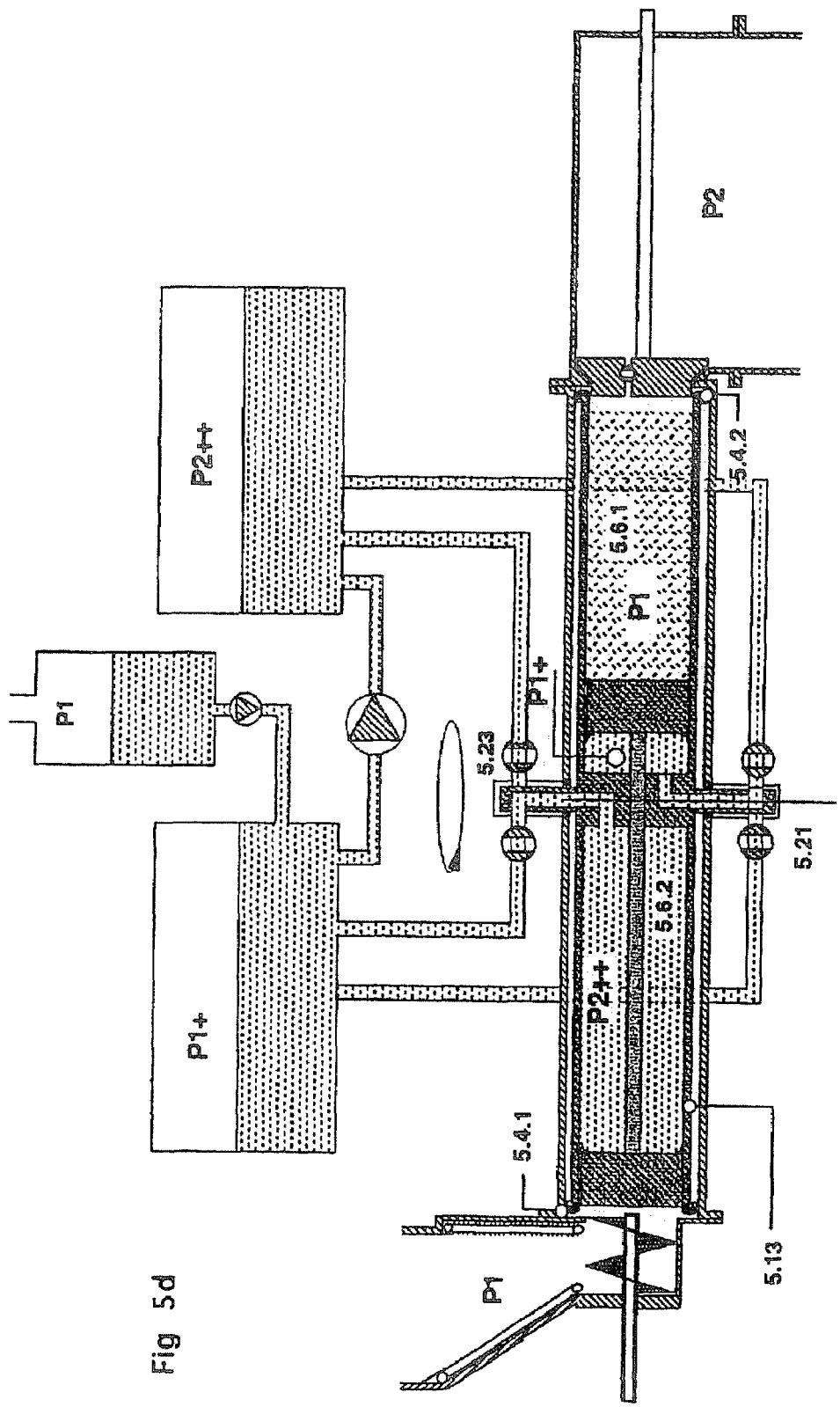

Example 2 describes a portioning device appropriate for pressurized conditions and with the possibility to serve two sluice devices. FIGS. 2a and 2b illustrates example 2.

FIG. 2a

The product is conveyed out from the high pressure zone by a screw conveyer 2.1 in the house 2.2. A traversing screw conveyer in the house 2.4 can rotate in both directions and thereby convey the product alternately through the pressure locks 2.5.1 and 2.5.2 and into the sluice chambers 2.6.1 and 2.6.2. When the traversing screw conveyer is loading for example the sluice chamber 2.6.1 a space free of product particles is created around the pressure lock 2.5.2. When sluice chamber 2.6.2 is loaded a space free of product particles is created around the pressure lock 2.5.1

Example 3 describes a sluice device appropriate when a controlled emission is acceptable during transfer of product from the low to the high pressure zone. FIGS. 3a-3f illustrates example 3.

FIG. 3a

The conveyer 3.1 moves the product portion into the intake hopper 3.3 equipped with 2 belt conveyers 3.2 providing combined compression- and transport. The product portion under the pressure P1 is forced into the sluice chamber 3.6. through an open pressure lock 3.4. A screw piston 3.5. in its position under the intake hopper 3.3 conveys the product portion towards the closed outlet pressure lock 3.8 by its rotating movement only, until the whole product portion has passed the inlet pressure lock 3.4.

FIG. 3b

The inlet pressure lock is closed.

FIG. 3c

The pressure in the sluice chamber is changed to the new pressure P2 by means of the equalization valve 3.9

FIG. 3d

The outlet pressure lock is opened, and an axial movement of the piston screw 3.5 is added to the rotation with an axial movement, which forces the product portion out of the sluice chamber 3.6 past the outlet pressure lock and Into the new pressure zone 3.10.

FIG. 3e

The outlet pressure lock 3.8 is closed when the piston screw 3.5 has been pulled back in the sluice chamber 3.6 by its axial movement.

FIG. 3f

The pressure is changed to the pressure P1 of the first pressure zone by means of the equalization valve 3.9, after which the inlet pressure lock 3.4 is opened and the next product portion can be loaded into the sluice chamber.

Example 4 describes an embodiment of the sluice device appropriate when emission during transfer of product from the low to the high pressure zone is unacceptable. The flow of the product turns 180° by passing through the sluice device. FIGS. 4a-4e illustrates example 4.

FIG. 4a

A product portion is conveyed into the intake hopper 4.1 equipped with two belt conveyers 4.2. At the same time the pressure lock 4.8 is opened. A piston screw 4.5 positioned at the inlet 4.3 forces the product portion into the sluice chamber 4.6.1 by its rotating movement only. The sluice chamber 4.6.1 is loaded and unloaded through the same opening, and can be turned around an axis 4.12 parallel to that of the piston screw and it is equipped with a piston 4.11.1 By this embodiment a second sluice chamber 4.6.2 is placed symmetrically in relation to the axis 4.12 and is equipped with the piston 4.11.2. The two sluice chambers with their pistons and means to move the pistons constitute a rotor 4.13, which can turn around the axis 4.12 and be moved by axial displacement FIG. 4b The sluice chamber piston 4.11.1 is during the forced loading moved from the starting position at the sluice chamber opening towards the back of the sluice chamber 4.6.1. The other sluice chamber piston 4.11.2 will at the same time move from the start position in the back of the sluice chamber towards and past the opening, forcing the product portion out of the sluice chamber into the second pressure zone 4.10. The piston screw 4.5 forces the product portion past the opening of the sluice chamber 4.6.1 by an axial movement added to the rotation.

FIG. 4c

The piston 4.11.2 is pulled so far back, that it aligns with the opening of the sluice chamber 4.6.2, and the pressure lock 4.8 is closed by moving it to the inlet 4.7 of the high pressure zone and the piston screw 4.5 is pulled back to its position at the inlet 4.3 of the sluice chamber.

FIG. 4d

The pressure locks 4.4.1 and 4.4.2 are opened by axial displacement of the rotor away from the inlet hopper 4.1 and the inlet 4.7 to the high pressure zone. Thereafter the rotor is turned 180° whereby the sluice chamber 4.6.1 will change positions with the sluice chamber 4.6.2.

FIG. 4e

The pressure locks 4.4.1 and 4.4.2 are closed by retraction of the rotor 4.13, and the sluice chamber 4.6.2 is ready to be force loaded with the next product portion, and the pressure in the sluice chamber 4.6.1 is changed to the high pressure P2 by the equalization valve 4.9. Thereafter the pressure lock 4.8 is opened and the sluice chamber 4.6.1 is ready to be emptied.

Example 5 describes like example 4 an embodiment of the sluice device appropriate when emission is unacceptable during transfer of product from the low pressure zone to the high pressure zone. Contrary to example 4, the axis of the sluice chamber rotor of example 5 is perpendicular to the axis of the sluice chambers and the piston screw. This means, that the flow of product will maintain the direction imposed by the piston screw by passing through the sluice device. Furthermore the pistons unloading the sluice chambers of example 5 are driven by a pressurized liquid, which at the same time serve as a very effective sealing device against leaking from the high pressure zone into the sluice chamber during forced unloading. This sealing method is of special importance when the temperature of the high pressure zone is higher than traditional sealing materials can tolerate as for example the 700-1100° C. in a gasifier.

FIG. 5a

A product portion is conveyed into the intake hopper 5.1 equipped with two belt conveyers 5.2. At the same time the pressure lock 5.8 is opened. A piston screw 5.5 positioned at the inlet 5.3 forces the product portion into the sluice chamber 5.6.1 by its rotating movement only. The sluice chamber 5.6.1 is loaded and unloaded through the same opening, and can be turned around an axis 5.12 perpendicular to that of the piston screw and equipped with a piston 5.11.1 By this embodiment a second sluice chamber 5.6.2 is placed symmetrically in relation to the axis 5.12 and is equipped with the piston 5.11.2. The two sluice chambers with their pistons constitute a rotor 5.13, which can turn around the axis 5.12 in the rotorhouse 5.15. The two pistons 5.11.1 and 5.11.2 are connected by a piston rod 5.14. The rotorhouse is pressure tight connected to the intake hopper 5.1 and the high pressure zone 5.10.

The combined driving and sealing device for the double piston 5.11.1/5.11.2 consist of a container 5.16 with a reservoir of a liquid, which can be pumped by the pump 5.17 to a container 5.18 partly filled with the said liquid, thereby maintaining a pressure P1+ somewhat higher than P1. The said liquid can be pumped by the pump 5.20 from the container 5.18 into a similar container 5.19, thereby maintaining a pressure P2++ somewhat higher than P2. Furthermore the combined driving and sealing device consist of pipes and ducts in the axis 5.12 and 4 valves 5.21-5.24 by which the two sluice chambers 5.6.1 and 5.6.2 can be connected to the two containers 5.18 and 5.19. When the sluice chamber 5.6.1 is loaded the liquid behind the piston 5.11.1 will be conducted through 5.21 into 5.18 and simultaneously an equivalent amount of liquid will be conducted from 5.19 through 5.23 into the part of the sluice chamber 5.6.2 behind the piston 5.11.2. In order to maintain correct pressures an equivalent amount of liquid will be pumped from 5.18 to 5.19 simultaneously.

FIG. 5*b*

The sluice chamber piston 5.11.1 is during the forced loading moved from the opening towards the back of the sluice chamber 5.6.1. Thereby the piston 5.11.2 will at the same time move from the back of the sluice chamber 5.6.2 towards and past the opening, forcing the product portion out of the sluice chamber into the second pressure zone 5.10. The piston screw 5.5 forces the product portion past the opening of the sluice chamber 5.6.1 by an axial movement added to the rotation.

FIG. 5*c*

The pressure lock 5.8 is closed by moving it to the inlet 5.7 and thereby it forces the piston 5.11.2 so far back, that it aligns with the opening of the sluice chamber 5.6.2. The piston screw 5.5 is pulled back to its position at the inlet 5.3.

FIG. 5*d*

The pressure locks 5.4.1 and 5.4.2 are opened by contraction of the sealing rings, and the ball valves 5.21 and 5.23 are closed. Thereafter the rotor 5.13 is turned 180° whereby the sluice chamber 5.6.1 will change positions with the sluice chamber 5.6.2.

FIG. 5*e*

The pressure locks 5.4.1 and 5.4.2 are closed by expansion of the sealing rings, and the pressure in the sluice chamber 5.6.1 is changed to the high pressure P2 by the equalization valve 5.9. Thereafter the pressure lock 5.8 and the ball valves 5.22 and 5.24 are opened and the sluice chamber 5.6.2 is ready to be force loaded with the next product portion, and the sluice chamber 5.6.1 is ready to be force unloaded.

The invention claimed is:

1. A method for transfer of a particulate product between two zones with different pressures, P1 and P2, respectively, the method comprising:

conducting the product from the first pressure zone through a portioning device which produces uniform product portions, and thereupon conveying the product portions individually through a sluice device, which comprises at least one chamber and two pressure locks, force loading the product portions from the first pressure zone into said chamber by means of a piston screw, the axis of which is practically in line with the axis of the chamber, compressing the product during the transfer from the first pressure zone to the second pressure zone, force unloading the product portions from the chamber and into the second pressure zone by means selected from the group consisting of: said piston screw, a piston, and a supply of gas, steam or liquid supplied at a pressure higher than that of the second pressure zone, dividing the uniform product portions by uniform particle free spaces, so as to secure that no particles occur in working spaces of the pressure locks when the pressure locks are closing, securing a pressure tight barrier between the two pressure zones at any time by at least one of the pressure locks, providing said chamber in the form of a sluice chamber, changing the pressure in the sluice chamber from P1 to P2 when a product portion is present in the sluice chamber and both pressure locks are closed, changing the pressure in the sluice chamber from P2 to P1 when a product portion has been unloaded from the sluice chamber and both pressure locks are closed.

2. A method according to claim 1, wherein the portioning device comprises a transportation device, which produces uniform product portions by running in defined periods and produces uniform particle free spaces by stopping in defined periods.

3. A method according to claim 1, wherein the portioning device comprises a transportation device, which is running continuously, and an accumulation device, which produces particle free spaces between the product portions, during loading, and produces uniform product portions during unloading.

4. A method according to claim 1 wherein the portioning device comprises a transportation device, which is running continuously and a two way distributor, dividing the continuous product stream into two streams of product portions.

5. A method according to claim 1, wherein the second pressure zone is a high pressure zone, and wherein the product portions from the portioning device one by one are force loaded into a sluice chamber through an open inlet pressure lock, and wherein a piston screw in the sluice chamber in a position at the inlet by its rotating movement forces the product portion towards a closed outlet pressure lock until the whole product portion has passed the inlet pressure lock, and wherein the inlet pressure lock thereafter is closed, and wherein the pressure in the sluice chamber thereafter is changed to the pressure of the second pressure zone, P2, and wherein the outlet pressure lock thereafter is opened, and wherein the sluice chamber is subsequently force unloaded by the piston screw supplying its rotating movement with an axial movement, forcing the product portion past the open outlet pressure lock and into the second pressure zone, and wherein the piston screw thereafter is pulled back to the position at the inlet, and wherein the outlet pressure lock thereafter is closed, and wherein the pressure of the sluice chamber thereafter is changed to that of the first pressure zone, P1, which is a low pressure zone and wherein the inlet pressure lock thereafter is opened, and the next product portion can be force loaded into the sluice chamber.

6. A method according to claim 1, wherein the second pressure zone is a high pressure zone, and wherein the product portions from the portioning device one by one are conveyed through a sluice device comprising a rotor with an axis parallel to two identical sluice chambers which are placed symmetrically about the axis of the rotor around which axis the sluice chambers can turn in stages of 180° and wherein each of the two sluice chambers has one opening which alternating can be connected to the two pressure zones to be force loaded by means of a piston screw placed in front of the sluice chamber and force unloaded by means of a piston placed in the sluice chamber and wherein two pressure locks are placed between the two pressure zones of which the first pressure lock comprises two sealing rings placed between the openings of the sluice chambers and the openings of the two pressure zones, which sealing rings can be extended when the rotor is stationary and contracted when the rotor is turning and the second pressure lock comprises a valve placed at the opening of the second pressure zone, and wherein the rotor is placed in a rotor house which is pressure-tightly connected to the two pressure zones.

7. A method according to claim 6, wherein the two sealing rings of the first pressure lock are closed by means of an axial movement of the rotor towards the openings of the two pressure zones and opened by means of the reversed movement.

8. A method according to claim 1, wherein the second pressure zone is a high pressure zone, and wherein the product portions from the portioning device one by one are conveyed through a sluice device comprising a rotor with an axis perpendicular to two identical sluice chambers which are placed symmetrically about the axis of the rotor which axis is traversing the joint end wall of the two sluice chambers and wherein the two pistons are connected by means of a piston rod providing a distance between the pistons which implies that the one sluice chamber is fully loaded with product when the other is fully unloaded, and wherein each of the two sluice chambers has one opening which alternating can be connected to the two pressure zones to be force loaded by means of a piston screw placed in front of the sluice chamber and force unloaded by means of a piston placed in the sluice chamber and wherein two pressure locks are placed between the two pressure zones of which the first pressure lock comprises two sealing rings placed between the openings of the sluice chambers and the openings of the two pressure zones, which sealing rings can be extended when the rotor is stationary and contracted when the rotor is turning and the second pressure lock comprises a valve placed at the opening of the second pressure zone, and wherein the rotor is placed in a rotor house which is pressure-tightly connected to the two pressure zones.

9. A method according to claim 5, wherein the pressure locks are opened or closed only when essentially the same pressure has been established on both sides of the pressure lock.

10. A method according to claim 5, wherein the unloading of a product portion from a sluice chamber at the high pressure is conducted by maintaining the pressure of the high pressure zone during the rapid opening of the pressure lock thereby achieving an explosive discharge of the product into the low pressure zone.

11. A method according to claim 10, wherein the pressure of the sluice chamber is increased in excess of the pressure of the high pressure zone to a level where effective explosion pulping of lignocellulosic products can be achieved.

12. A method according to claim 7, wherein the pistons in the sluice chambers are driven by one or more hydraulic devices, and wherein a connection is established between the closed ends of the two sluice chambers of which the space behind the two pistons is pressurized with gas, vapour or liquid to a level which will prevent leakage from the high pressure zone to bypass the pistons during transfer of product from the sluice chamber to the high pressure zone.

13. A method according to claim 6, wherein the two sluice chambers at the closed ends are connected to a hydraulic system which can maintain a pressure P1+ behind the piston of the sluice chamber under loading with product from the low pressure zone with the pressure P1 and maintain a pressure P2++ behind the piston of the sluice chamber under unloading to the high pressure zone with the pressure P2 and wherein the differential pressure P2++ minus P2 can be adjusted to a level high enough to generate the driving force to the unloading piston and wherein the differential pressure P1+ minus P1 can be adjusted to a level appropriate for the piston screw to press back the piston of the sluice chamber under loading with the force needed for the required compression of the product.

14. A method according to claim 1, wherein a required compression of the product during transfer from the first to the second pressure zone is controlled by adjusting the volume of the product portions provided by the portioning device in relation to the effective volume of the actual sluice chamber.

15. A method according to claim 14, wherein the compression is provided by means of the piston screw during force loading of the sluice chamber.

16. A method according to claim 14, wherein the compression partly is provided by means of the piston screw during force loading of the sluice chamber and partly by means of compression devices integrated in the portioning device and or in the device conveying the product portions to the piston screw.

17. An apparatus for transfer of a particulate product between two zones with different pressures, P1 and P2, respectively, the apparatus comprising:

a portioning device through which the product is conducted from the first pressure zone, the portioning device being adapted to produce uniform product portions, a sluice device through which the product portions may be individually conveyed, the sluice device comprising at least one chamber and two pressure locks, a piston screw for force loading the product portions from the first pressure zone into said chamber, the axis of the piston screw being practically in line with the axis of the chamber, whereby the product can be compressed during the transfer from the first to the second pressure zone, means for force unloading the product portions from the chamber and into the second pressure zone, said means for force unloading being selected from the group consisting of: the piston screw, a piston, and a supply of gas, steam or liquid at a pressure higher than that of the second pressure zone:

wherein the portioning device is adapted to divide the uniform product portions by uniform particle free spaces, so as to secure that no particles occur in working spaces of the pressure locks when they are closing, the pressure locks are adapted to secure a pressure tight barrier between the two pressure zones, said chamber is a sluice chamber, the pressure in which is controllable in such a way that it can be changed from P1 to P2 when a product portion is present in the sluice chamber and both pressure locks are closed, and such that it can be changed from P2 to P1 when a product portion has been unloaded from the sluice chamber and both pressure locks are closed.

* * * * *